(12) United States Patent
Burns

(10) Patent No.: US 11,234,547 B1
(45) Date of Patent: Feb. 1, 2022

(54) CLOTHING ITEM REMOVAL AID

(71) Applicant: Michael Paul Burns, Waunakee, WI (US)

(72) Inventor: Michael Paul Burns, Waunakee, WI (US)

(*) Notice: Subject to any disclaimer, the term of this patent is extended or adjusted under 35 U.S.C. 154(b) by 25 days.

(21) Appl. No.: 16/849,758

(22) Filed: Apr. 15, 2020

Related U.S. Application Data

(60) Provisional application No. 62/836,029, filed on Apr. 18, 2019.

(51) Int. Cl.
*A47G 25/90* (2006.01)
*F16B 2/10* (2006.01)

(52) U.S. Cl.
CPC ............... *A47G 25/90* (2013.01); *F16B 2/10* (2013.01)

(58) Field of Classification Search
CPC .... A47G 25/90; A47G 25/901; A47G 25/902; A47G 25/905; A47G 25/908; F16B 2/10; F16B 2/00; F16B 2/005; F16B 2/02; F16B 2/06
See application file for complete search history.

(56) References Cited

U.S. PATENT DOCUMENTS

| | | | |
|---|---|---|---|
| 4,115,906 A * | 9/1978 | Lavine | A41F 17/04 2/233 |
| 5,388,313 A * | 2/1995 | Cameron | A41F 3/04 24/265 EC |
| 5,687,889 A | 11/1997 | Liden | |
| 5,842,256 A * | 12/1998 | Anscher | A44B 99/00 24/3.4 |
| D666,730 S * | 9/2012 | Del Solar | A41F 17/04 D24/194 |
| 8,910,983 B1 | 12/2014 | Neff | |
| 9,797,422 B2 * | 10/2017 | Giannatti | F16B 2/10 |
| 10,016,082 B1 | 7/2018 | Merker | |
| 2009/0039118 A1 * | 2/2009 | Whitlaw | A47G 25/90 223/111 |
| 2010/0258600 A1 | 10/2010 | Pfistor et al. | |
| 2011/0315724 A1 | 12/2011 | Whitlaw | |
| 2017/0051871 A1 * | 2/2017 | Brzezicki | B25B 5/16 |
| 2019/0045959 A1 * | 2/2019 | Merker | A47G 25/90 |

FOREIGN PATENT DOCUMENTS

GB 190200448 A * 5/1902

\* cited by examiner

*Primary Examiner* — Ismael Izaguirre
(74) *Attorney, Agent, or Firm* — Brannen Law Office, LLC

(57) ABSTRACT

The present invention relates to a removal aid used to assist in the removal of clothing items such as jackets, sweaters, shirts and the like. The aid is a device having a clamp with two sections that are pivotally joined together. Each section has a head that is elongated. The clamp has a lock for locking the clamp in a closed position. A pull has two ends, one of which is connected to a clamp section. The second end of the pull can have a loop. The pull is preferably a flexible pull. A user secures the device onto an end of a sleeve and locks the clamp with the lock. Then, the user places the loop over upon an object so that the pull pulls the arm portion of the garment off from the user's arm as the user moves away or twists relative to the object.

8 Claims, 8 Drawing Sheets

CLOTHING ITEM REMOVAL AID

This United States utility patent application claims priority on and the benefit of provisional application 62/836,029 filed Apr. 18, 2019, the entire contents of which being hereby incorporated herein by reference.

BACKGROUND OF THE INVENTION

1. Field of the Invention

The present invention relates to a removal aid used to assist in the removal of clothing items such as jackets, sweaters, shirts and the like.

2. Description of the Related Art

Coats, jackets, shirts and sweaters (and other clothing items or garments as well) can have a chest portion that is split. Sometimes the split can be selectably closable by the user. Two common examples, merely for illustration, are zippers and buttons. The clothing items also typically have arm portions that cover the wearer's arms.

For people that are young and healthy, and without medical conditions affecting use of their arms, removal of the clothing item is normally uneventful. The person can remove one arm from the clothing item at a time. However, for some, including some elderly people, those that are injured or have medical conditions, removal of this type of clothing item can prove challenging or difficult. This can be due to range of motion, flexibility, dexterity, muscle control or strength, or other issues.

Tools have been developed over the years designed to address the difficulties in dressing and undressing.

None of the tools developed solve all of the problems that the present invention solves.

Thus, there exists a need for clothing item removal aid that solves these and other problems.

SUMMARY OF THE INVENTION

The present invention relates to a removal aid used to assist in the removal of clothing items such as jackets, sweaters, shirts and the like. The aid is a device having a clamp with two sections that are pivotally joined together. Each section has a head that is elongated. The clamp has a lock for locking the clamp in a closed position. A pull has two ends, one of which is connected to a clamp section. The second end of the pull can have a loop. The pull is preferably a flexible pull. A user secures the device onto an end of a sleeve and locks the clamp with the lock. Then, the user places the loop over upon an object so that the pull pulls the arm portion of the garment off from the user's arm as the user moves away or twists relative to the object.

According to one advantage of the present invention, a non-complicated device is provided that a user can use to aid in the removal of a clothing item. The device can have a clamp that secures to an end of an arm portion, securing a pull to an object, and removing the users arm from the clothing item as the user twists or moves away from the object.

According to another advantage of the present invention, the clamp of the device has sections each with a head that is elongated and shallow to facilitate slipping under the distal end of an arm portion of the clothing item.

According to another advantage of the present invention, the pull can be a flexible pull. This aids both in storage, transport and use. In storage, the pull does not take up much space such that the device can easily be placed in a pocket or purse for storage and/or transport. In use, the pull can act in tension to aid in garment removal once it is straightened out.

According to another advantage of the present invention, a hole is formed in one end of the handle. This allows the handle to be secured to a hook (could be mounted to a door hinge with a door hinge pin). This is useful for one handed operation, wherein the user can position the clamp upon the hook and then position the garment between the clamp heads. Then, the user can lock the clamp with one hand. With the clamp remaining on the hook on the hinge pin, the user pulls the arm portion of the garment off the user's arm as the user moves away or twists relative to the hook. The hook may be left on a door hinge pin (which can be on a door most used to enter a structure or a room such as a bedroom where a user typically removes clothing). Then, the distal end of the pull can be secured to an object and the device can aid in removal of the clothing item.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
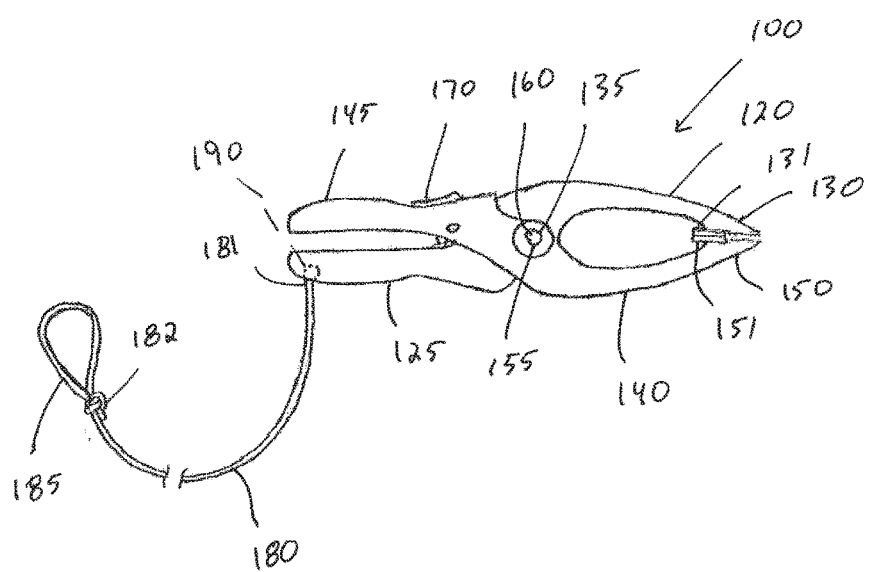
FIG. 1 is an illustration of a preferred embodiment of the device of the present invention.
Figure 2:
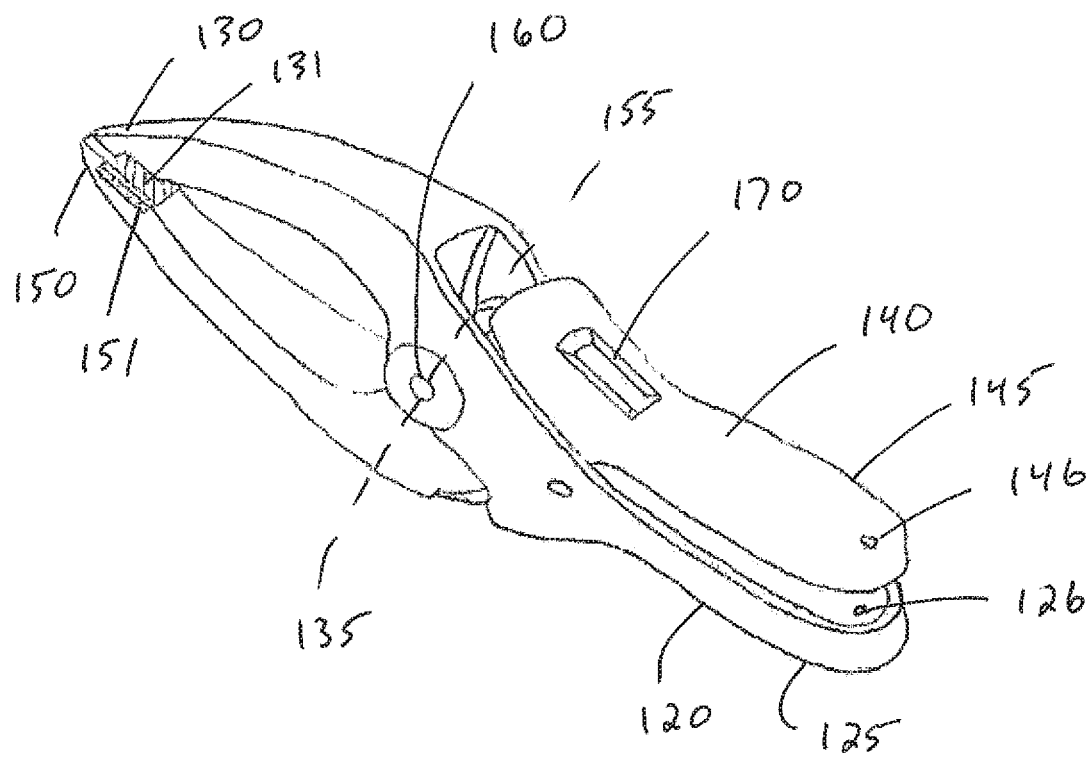
FIG. 2 is a perspective isolation view of the clamp illustrated in FIG. 1, showing the clamp in a clamped position.
Figure 3:
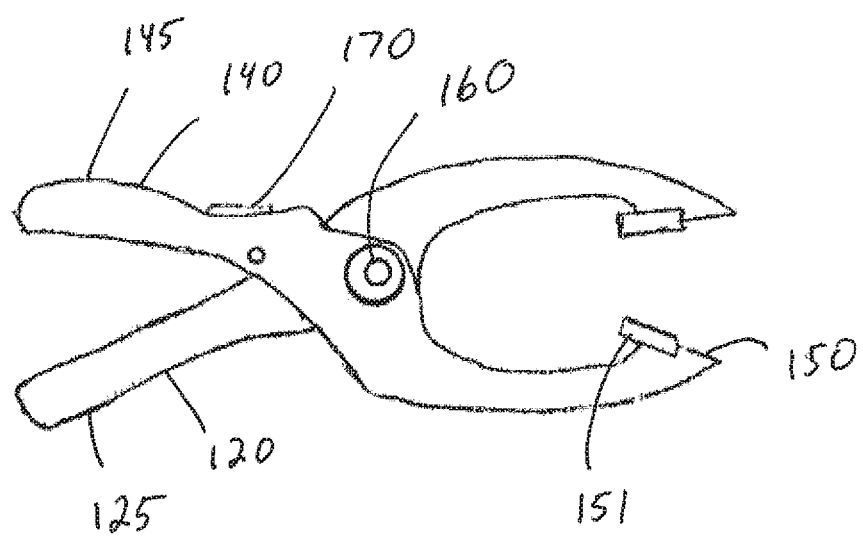
FIG. 3 is a side view showing the clamp in an open position.
Figure 4:
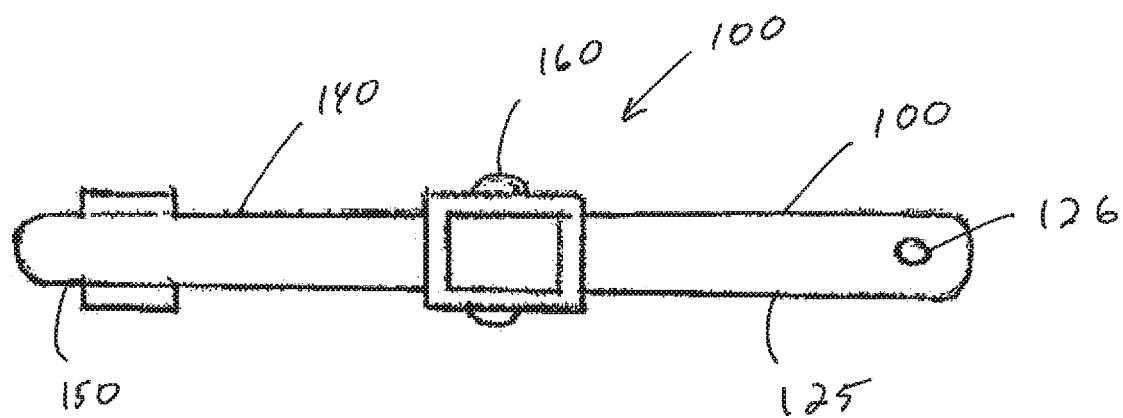
FIG. 4 is a bottom isolation view of the clamp illustrated in FIG. 1.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The device 100 of the present invention is used by a user (person) 10 having a head 15, a torso, 20, an arm 25 with a hand 30 at the distal end of arm 25, and an arm 35 with a hand 40 at the distal end of arm 35. The device can be used with either arm 25 or 35.

The user 10 can wear a clothing item 50 having a chest 60 divided with a split, and two arms 70 and 80. Each arm 70 and 80 has a respective distal end. The clothing item can be, by way of example only, a shirt, a coat, a jacket, or a sweater. The present invention is not limited by any particular type of clothing.

Figure 5:
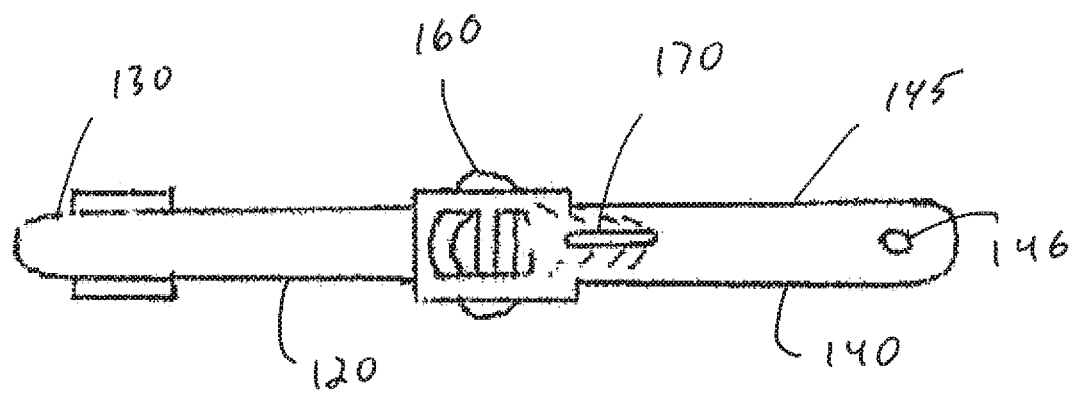
FIG. 5 is a top isolation view of the clamp illustrated in FIG. 1.

An embodiment of a preferred embodiment of the device 100 of the present invention is illustrated in FIG. 1. The device 100 has a clamp 110 and a pull 180. The clamp is shown in isolation in FIGS. 2-5. The pull 180 is shown in isolation in FIG. 5.

Looking specifically at FIGS. 2-5, it is seen that the clamp 110 has a first section 120 and a second section 140. The first section 120 has a handle 125 with a hole 126 on one end and head 130 on the opposite end. A pivot hole 135 is between the ends of the first section. The second section 140 has a handle 145 with a hole 146 on one end and head 150 on the opposite end. A pivot hole 155 is between the ends of the second section. The first section 120 and second section 140 are pivotally joined with a pivot 160. A lock 170 is provided for locking the clamp in the locked, or clamped, position with the heads 130 and 150 in clamping engagement. The lock can be operable by way of example in a ratcheting manner. It can operate in a different manner without departing from the broad aspects of the present invention. Heads 130 and 150 are elongated and shallow heads, wherein they can slip between the user and the distal end of the arm portion 70 or 80 of the clothing item 50. Head 130 has a grip 131. Head 150 has a grip 151. Grips 131 and 151 come together in an abutting manner where no garment is clamped and when no clothing item is therebetween. Grips come together to securely grip an article of clothing that is between the heads 130 and 150 when the clamp is locked in the clamped position. The lock can be released with a release, which can be a button, lever or other suitable release structure. Each grip can be made of a material such as, but not limited to, rubber, and can have ridges, whereby the grips are able to securely hold an item of clothing without causing damage thereto.

Figure 6:
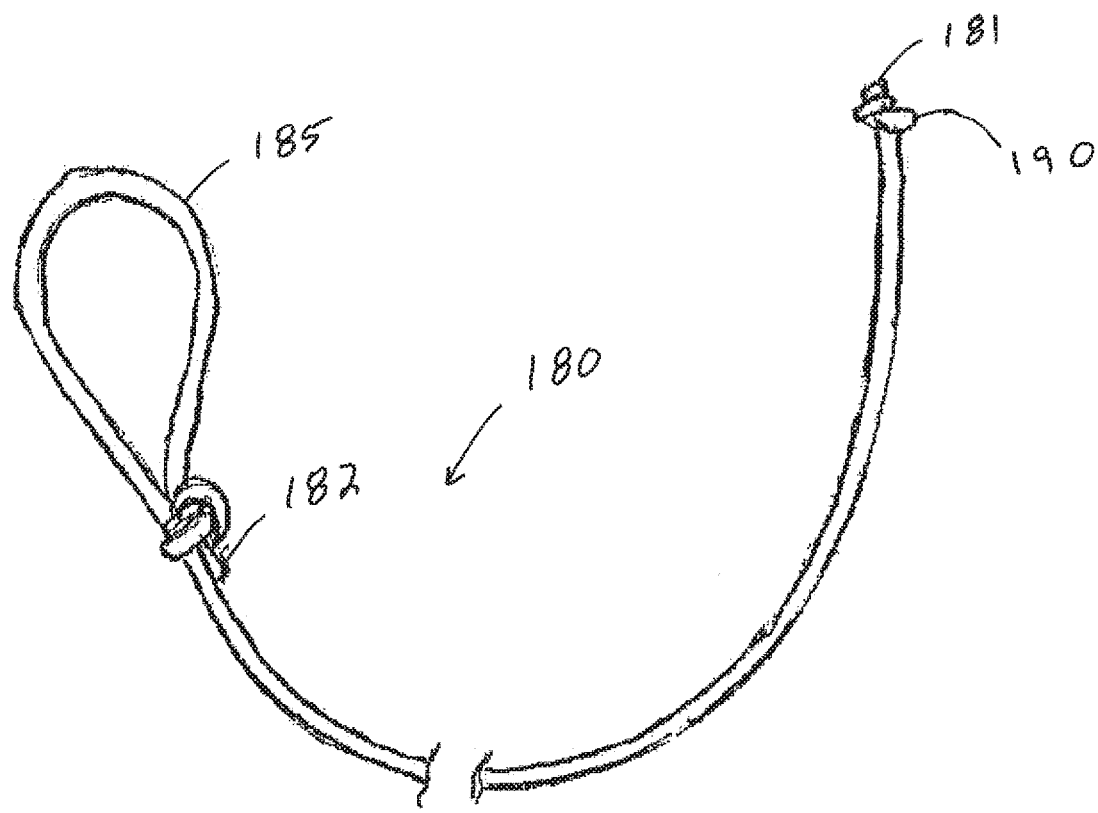
FIG. 6 is an isolation view of a pull illustrated in FIG. 1.

Looking now specifically at FIG. 6, it is seen that the pull 180 has ends 181 and 182. A loop 185 can be formed at one of the ends. A knot 190 can be formed in the other end. The pull 180 is preferably make of a flexible material, such as string or rope. In a preferred embodiment, the pull 180 has a length of between 6 and 16 inches. However, it is understood that the pull could be longer or shorter without departing from the broad aspects of the present invention.

The pull 180 is connected to either of the first section 120 or second section 140 of the clamp 110. This is accomplished by passing the pull 180 through hole 126 or 146 and then by forming the knot 190, wherein the knot 190 has a sufficient size to prevent it from being pulled back through the hole 126 or 146.

A new method of removing a clothing item 50 is illustrated through use of the device 100. The method is described below.

Figure 7:
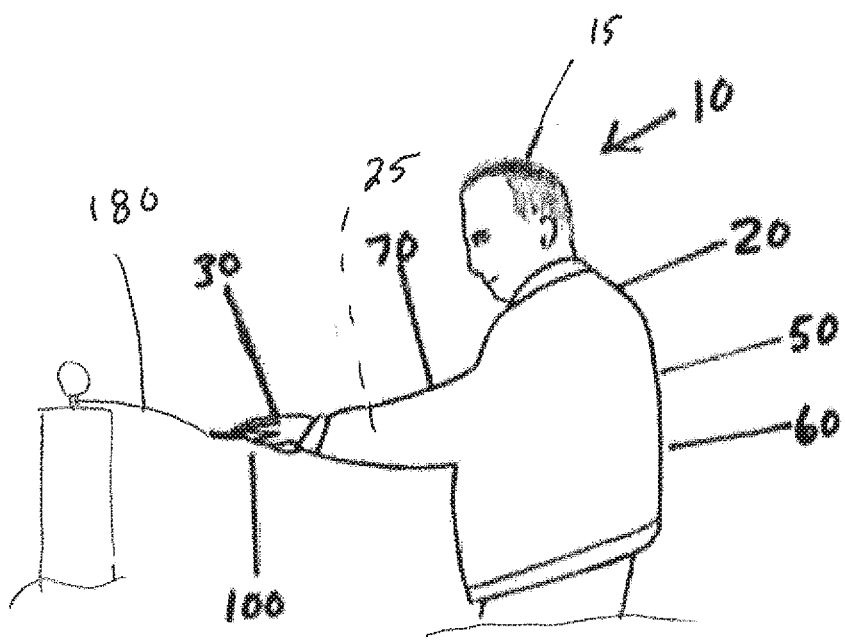
FIG. 7 is a view showing the clamp being connected to a clothing item.
Figure 8:
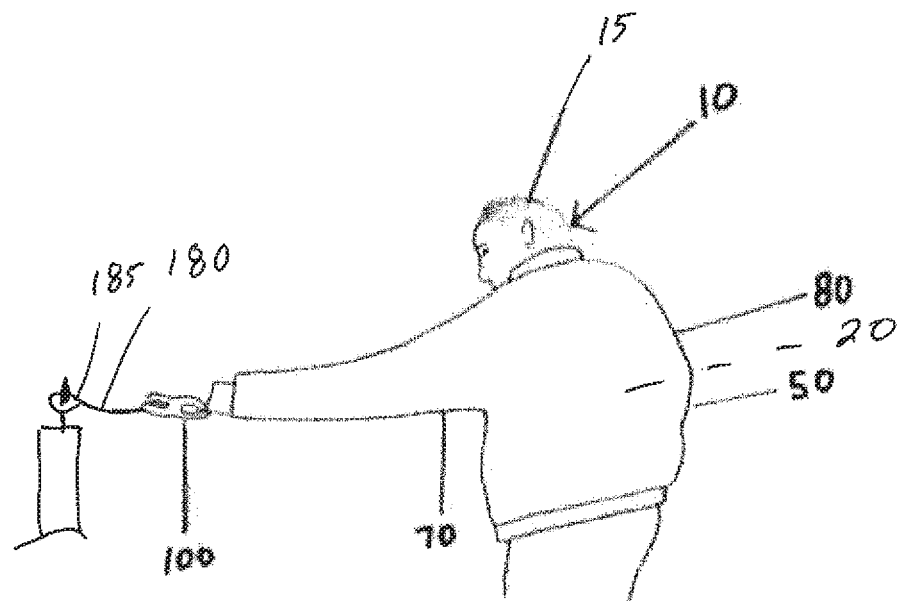
FIG. 8 is a view showing the device starting to pull the clothing item from a user's arm.
Figure 9:
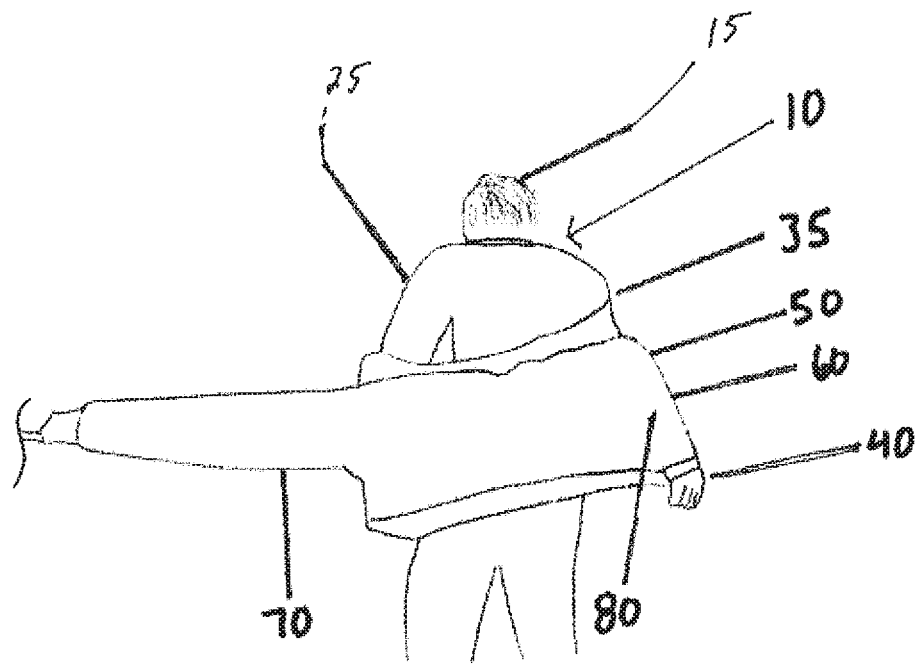
FIG. 9 is a view showing progress in the device pulling the clothing item from a user's arm.

The user 10 wearing the article of clothing 100 is provided. The user can obtain the device (could be in plain sight or could be concealed from transport or storage). The user can place one of the first section head or second section head under the arm distal end. The user can then lock the clamp 110 thereby fastening the clamp 110 to the distal arm end of arm 70 or 80. The user 10 can then locate an object upon which the loop 185 can be secured. This could be a railing, a knob, a hook or other preferably stationary structure. The user places the loop 185 upon the object. Then the user 10 moves away from the object, optionally twisting their torso 20, such that the device 100 pulls the distal end of the arm 70 or 80 from the user's arm 25 or 35, respectively. Portions of this sequence of events is illustrated in FIGS. 7-9.

It is appreciated that in an alternative embodiment, not illustrated, that a clip, second clamp, or other securing structure could be provided instead of a loop to secure end 181 of the pull 180 to an object without departing from the broad aspects of the present invention.

Figure 10:
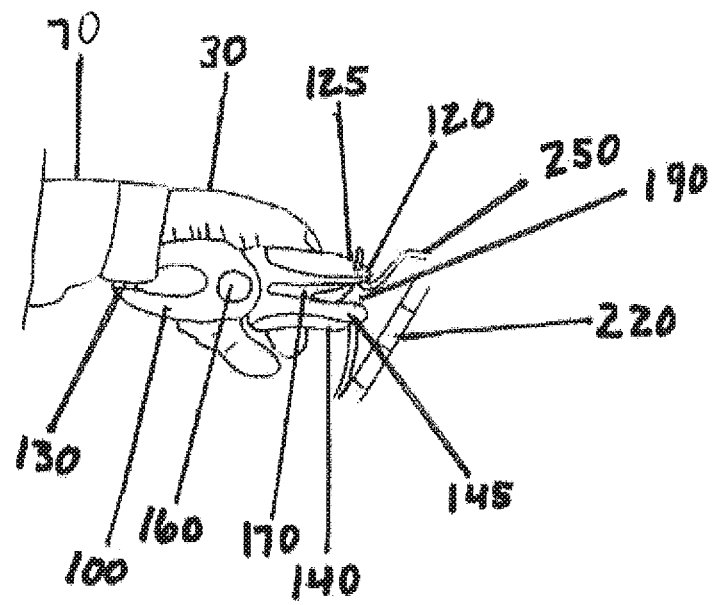
FIG. 10 is a view showing one-handed operation of the device while locking.
Figure 11:
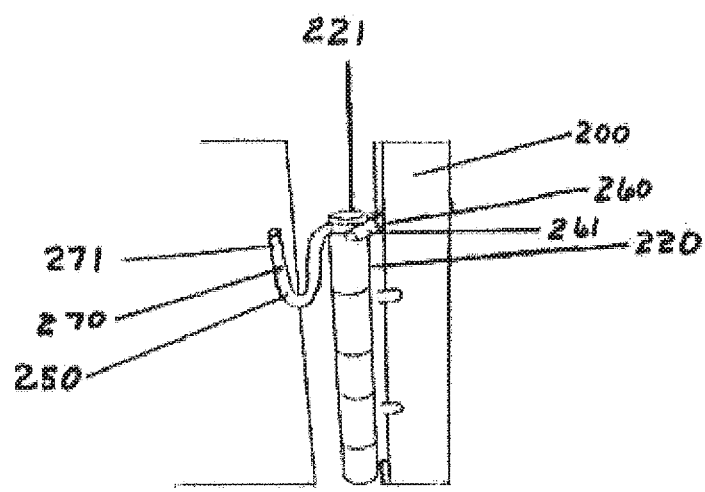
FIG. 11 is a view showing a hook mounted to a door hinge.
Figure 12:
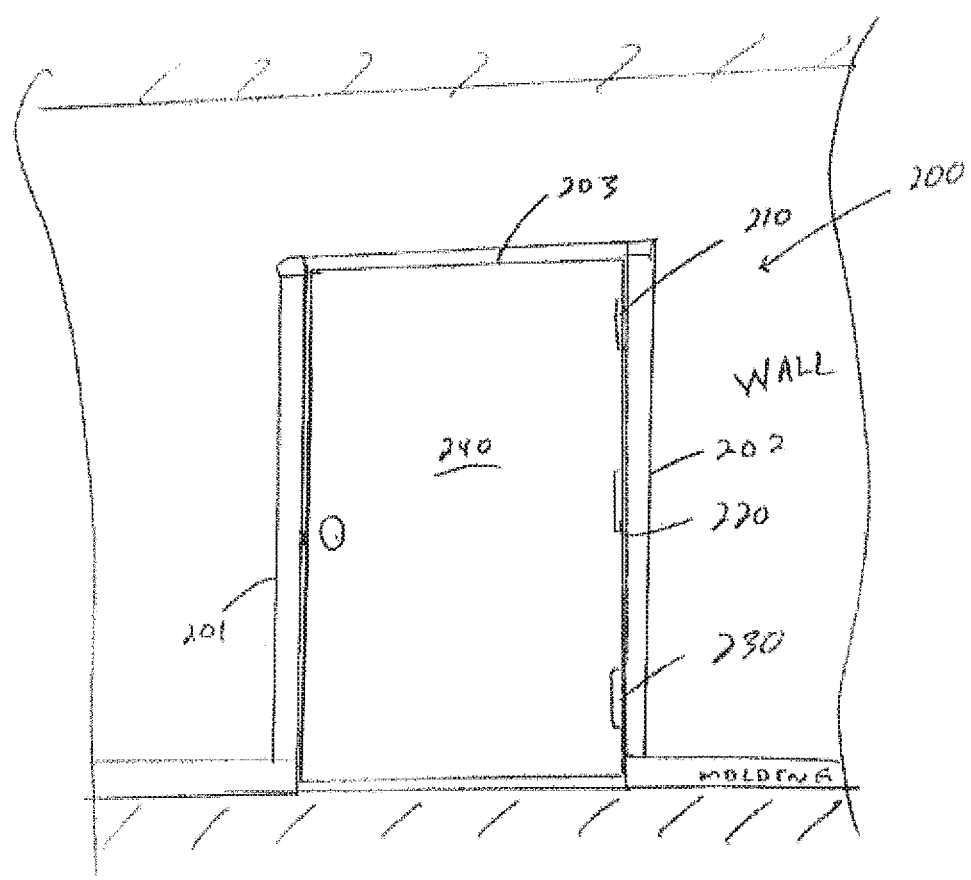
FIG. 12 is an illustration of a door and door frame.

Turning now to FIGS. 10 and 11, an optional additional aspect of the present invention is illustrated. A door frame 200 is illustrated having side 201, side 202 and top 203. Three hinges 210, 220 and 230 are provided for hingedly securing a door 240 to the door frame 200. Each hinge has a hinge pin. Hinge 220 in particular has hinge pin 221.

A hook 250 is provided having end 260 with a securing ring 261 and end 270. End 270 has a supporter or engager 271 that is preferably generally U-shaped. The "U" is preferably open to the top, wherein one upper end of the engager is near the securing ring and the other upper end termination at a termination point. The securing ring 261 can be secured to the hinge 220 with the hinge pin 221. In use, the clamp 110 can be supported by the supporter 271. This is accomplished by placing the 100 upon the engager 271 allowing the termination point to pass through a section hole. The clamp is vertically supported independent of the user in this position. This can be done before the previously mentioned step of placing one of the first section head and second section head under the arm distal end is accomplished. In this regard, it is seen how the hook is useful to allow for single-handed operation of the device 100. The user can use their hand at the end of the arm from which the garment will first be removed to lock the clamp when the heads are in position.

It is appreciated that the looped end of the pull can be secured to the hook 250 as a suitable stationary object.

It is also appreciated that the looped end of the pull can be secured to a spindle of a railing when an intended use at a particular location is likely to recur frequently (examples are front door, garage door bedroom door). This is accomplished by tying a knot after the pull is wrapped around a spindle.

Figure 13:
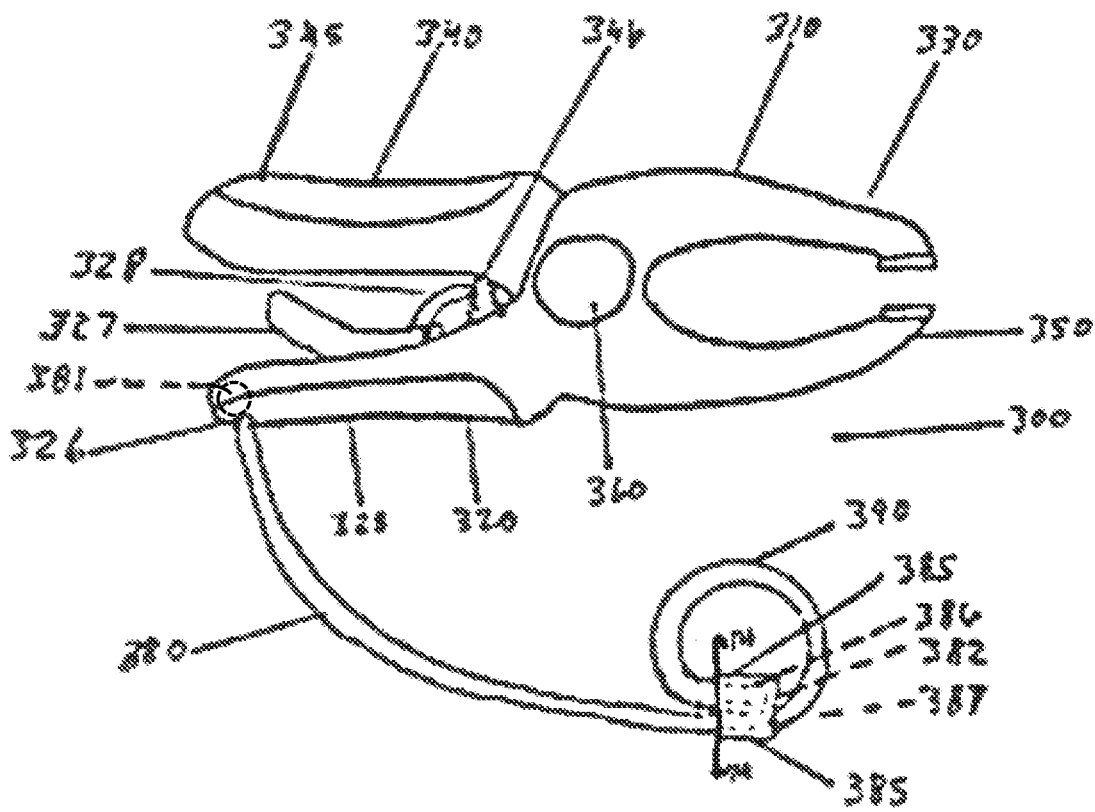
FIG. 13 is a view showing a loop formed with a slider.
Figure 14:
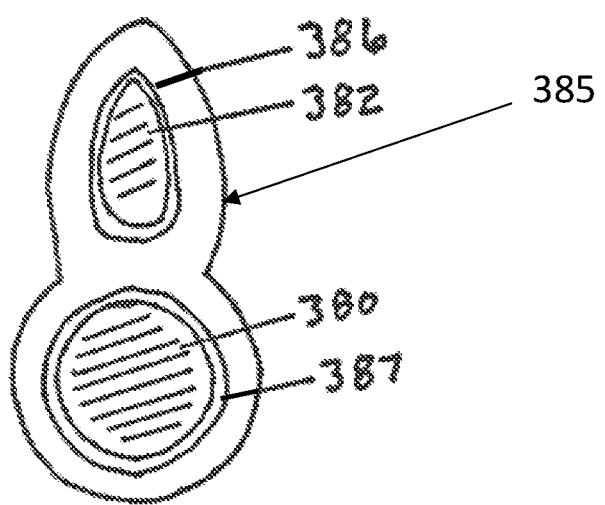
FIG. 14 is a cross-sectional view taken along line 14-14 in FIG. 13.

Turning now to FIGS. 13 and 14, it is seen that an alternative embodiment of a device 300 is provided. The device 300 has a clamp 310 and a pull 380. The clamp 310 has a first section 320 having a handle 325. The handle 325 has a hole 326 therethrough and a release 327. The release 327 is pivotally connected to a claw 328, with at least one tooth that that is spring biased away from the distal end of the handle 325. The release 327 can be engaged to overcome the bias and move the claw 328 away from its biased position. The first section 320 has a head 330 opposite the handle.

The clamp 310 also has a second section 340 having a handle 345. An arm 346, with teeth, is stationarily connected to the handle 345. The second section 340 also has a head 350 that is located opposite of the handle 345.

The first and second sections 320 and 340 are pivotally connected with a pivot. The claw 328 ratchets against an arm 346 to automatically lock (prevent reopening) the device. When the heads engage each other, or engage an item of clothing therebetween, the claw 328 and arm 346 securely hold the device in the locked position. The user can use the release 327 to disengage the claw 328 and arm 346 allowing the device to be opened.

The pull 380 is preferably a flexible pull. It can be made of rope, links, wire or other suitable material. Pull 380 has a first end 381 and a second end 382. A slider 385 is provided. It has one passage 386 that crimps onto the end 382 and one hole 387 that the first end 381 can be passed through to create a loop 390. The loop 390 is variable in size. In use, after the loop is secured to an object, the loop 390 automatically constricts as the user adds tension to the pull 380. This constriction secures the loop around the object to prevent inadvertent disengagement therebetween.

Thus, it is apparent that there has been provided, in accordance with the invention, a clothing item removal aid that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of removing a clothing item, the clothing item having an arm portion with an arm distal end, said method of removing a clothing item comprising the steps of:
    providing a user wearing the clothing item;
    providing a device with a clamp and a pull, the clamp having a first section with a first section head and a second section with a second section head;
    placing one of the first section head and second section head under the arm distal end;
    locking the clamp to secure device to the clothing item;
    providing a hook;
    providing a door hinge;
    supporting the hook with the door hinge;
    providing a hook hole in the device;
    supporting the device with the hook before the step of placing one of the first section head and second section head under the arm distal end is accomplished;
    providing an object upon which the pull can be secured to;
    securing the pull to the object; and
    removing the clothing item.

2. The method of claim 1, wherein the step of providing a device with a clamp and a pull further comprises the step of providing a flexible pull.

3. The method of claim 2, wherein the step of providing a flexible pull comprises the step of providing a loop used to secure the pull to the object.

4. The method of claim 3, wherein the step of providing a loop used to secure the pull to the object comprises the step of providing a slider having one passage used to securely hold an end of the pull and a second passage allowing a portion of the pull to pass therethrough, wherein the loop has a variable size.

5. The method of claim 4, wherein the step of providing a slider having one passage used to securely hold an end of the pull and a second passage allowing a portion of the pull to pass therethrough, wherein the loop has a variable size comprises the step of constricting the loop around the object when the pull is in tension.

6. The method of claim 1, wherein the step of removing the clothing item comprises the step of moving the clamp away from the object placing the pull in tension.

7. The method of claim 6, wherein the step of moving the clamp away from the object placing the pull in tension comprises the step of twisting a user's torso.

8. The method of claim 1 further comprising the steps:
    providing a release; and
    using the release to unsecure the clamp and the clothing item.

* * * * *